United States Patent
Kimura et al.

(10) Patent No.: US 10,094,257 B2
(45) Date of Patent: Oct. 9, 2018

(54) HONEYCOMB STRUCTURE AND METHOD FOR MANUFACTURING HONEYCOMB STRUCTURE

(71) Applicant: NGK INSULATORS, LTD., Nagoya (JP)

(72) Inventors: Keisuke Kimura, Nagoya (JP); Ryuta Kouno, Nagoya (JP); Shuichi Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 20 days.

(21) Appl. No.: 15/467,087

(22) Filed: Mar. 23, 2017

(65) Prior Publication Data
US 2017/0284246 A1    Oct. 5, 2017

(30) Foreign Application Priority Data
Mar. 31, 2016 (JP) .................. 2016-070562

(51) Int. Cl.
*B01D 46/24* (2006.01)
*F01N 3/00* (2006.01)
(Continued)

(52) U.S. Cl.
CPC ......... *F01N 3/0222* (2013.01); *B01D 46/247* (2013.01); *B01D 46/2448* (2013.01); *B01D 46/2459* (2013.01); *B01D 46/2474* (2013.01); *B28B 3/20* (2013.01); *B28B 11/243* (2013.01); *B32B 3/12* (2013.01); *B32B 18/00* (2013.01); *C04B 35/565* (2013.01); *C04B 35/6263* (2013.01); *C04B 37/005* (2013.01); *F01N 3/2828* (2013.01); *B01D 2046/2433* (2013.01); *B01D 2046/2437* (2013.01); *B01D 2265/04* (2013.01); *B01D 2275/406* (2013.01); *B28B 1/002* (2013.01); *B28B 2003/203* (2013.01); *C04B 2235/3208* (2013.01);
(Continued)

(58) Field of Classification Search
CPC .... B01D 46/00; B01D 46/24; B01D 46/2437; B01D 46/2451; B32B 3/00; B32B 3/12; F01N 3/00; F01N 3/0222
See application file for complete search history.

(56) References Cited

U.S. PATENT DOCUMENTS 9,429,054 B2    8/2016 Ichikawa et al.
9,764,990 B2 *  9/2017 Ichikawa ............ C04B 38/0009
(Continued)

FOREIGN PATENT DOCUMENTS

JP    2015-187044 A1    10/2015

*Primary Examiner* — Mark Kopec
(74) *Attorney, Agent, or Firm* — Burr & Brown, PLLC (57) ABSTRACT

A honeycomb structure includes honeycomb segments each having a porous partition wall defining a plurality of cells, and includes a porous bonding layer containing a crystalline anisotropic ceramic and disposed so as to bond side surfaces of the honeycomb segments to each other. A ratio of a pore volume (cc/g) of a fine pore defined as a pore in the bonding layer having a pore diameter of 10 μm or more and less than 50 μm with respect to a pore volume (cc/g) of a coarse pore defined as a pore in the bonding layer having a pore diameter of 50 μm or more and 300 μm or less is from 2.0 to 3.5, the pore volume of the fine pore is from 0.15 to 0.4 cc/g, and the pore volume of the coarse pore is from 0.05 to 0.25 cc/g.

14 Claims, 2 Drawing Sheets

(51) Int. Cl.
  *F01N 3/022* (2006.01)
  *B28B 3/20* (2006.01)
  *B28B 11/24* (2006.01)
  *B32B 3/12* (2006.01)
  *B32B 18/00* (2006.01)
  *C04B 35/565* (2006.01)
  *C04B 35/626* (2006.01)
  *C04B 37/00* (2006.01)
  *F01N 3/28* (2006.01)
  *B28B 1/00* (2006.01)

(52) U.S. Cl.
  CPC .......... *C04B 2235/3217* (2013.01); *C04B 2235/349* (2013.01); *C04B 2235/3445* (2013.01); *C04B 2235/3454* (2013.01); *C04B 2235/3472* (2013.01); *C04B 2235/522* (2013.01); *C04B 2235/524* (2013.01); *C04B 2235/5224* (2013.01); *C04B 2235/5228* (2013.01); *C04B 2235/5244* (2013.01); *C04B 2235/5248* (2013.01); *C04B 2235/5292* (2013.01); *C04B 2235/5296* (2013.01); *C04B 2235/5436* (2013.01); *C04B 2235/96* (2013.01); *C04B 2237/083* (2013.01); *C04B 2237/09* (2013.01); *C04B 2237/365* (2013.01); *C04B 2237/597* (2013.01); *F01N 2330/04* (2013.01); *F01N 2330/06* (2013.01); *F01N 2330/38* (2013.01); *F01N 2330/48* (2013.01); *Y02T 10/20* (2013.01)

(56) References Cited

U.S. PATENT DOCUMENTS

2012/0064286 A1* 3/2012 Hirose .............. B01D 46/2425
                                                              428/116
2015/0275725 A1   10/2015 Ichikawa et al.
2017/0282108 A1* 10/2017 Mizuno .................. F01N 3/0222

* cited by examiner

HONEYCOMB STRUCTURE AND METHOD FOR MANUFACTURING HONEYCOMB STRUCTURE

The present application is an application based on JP 2016-070562 filed on Mar. 31, 2016 with Japan Patent Office, the entire contents of which are incorporated herein by reference.

BACKGROUND OF THE INVENTION

Field of the Invention

The present invention relates to a honeycomb structure and a method for manufacturing the honeycomb structure. More specifically, the present invention relates to a honeycomb structure having a bonding layer of which a strength and a Young's modulus are maintained without largely increasing even after a heat treatment, and a method for manufacturing the honeycomb structure.

Description of the Related Art

Conventionally, as a trapping filter for a particulate matter (PM), for example, as a diesel particulate filter (DPF) for trapping and removing PM contained in an exhaust gas from a diesel engine or the like, a honeycomb structure has been used widely.

As this honeycomb structure, for example, a honeycomb structure obtained by bonding a plurality of honeycomb-shaped segments (honeycomb segments) to each other with a bonding layer formed of a bonding material has been known. As such a honeycomb structure, for example, a honeycomb structure having a bonding layer of which a Young's modulus is low while securing a necessary strength of the bonding layer has been reported (for example, see Patent Document 1).

[Patent Document 1] JP-A-2015-187044

SUMMARY OF THE INVENTION

In the honeycomb structure described in Patent Document 1, the bonding layer has a high strength (specifically, shear strength) and a low Young's modulus in an initial stage of manufacturing thereof. However, in the honeycomb structure described in Patent Document 1, the Young's modulus of the bonding layer may also increase as the strength of the bonding layer increases, when the bonding layer is subjected to a heat treatment. In a honeycomb structure in which such a tendency is strong, the bonding layer has a difficulty of performing an originally required function of relaxing a thermal stress in an engine drive environment, and the honeycomb structure does not have a sufficient durability. Therefore, development of a honeycomb structure having a bonding layer of which a strength and a Young's modulus are maintained without largely increasing even after a heat treatment has been desired.

The present invention has been achieved in view of the above-described problems. The present invention provides a honeycomb structure having a bonding layer of which a strength and a Young's modulus are maintained without largely increasing even after a heat treatment, and a method for manufacturing the honeycomb structure.

[1] A honeycomb structure including a plurality of pillar-shaped honeycomb segments each having a porous partition wall defining a plurality of cells that extend from a first end face as one end face to a second end face as the other end face and that serve as a channel of a fluid; and a porous bonding layer containing a crystalline anisotropic ceramic and disposed so as to bond side surfaces of the plurality of honeycomb segments to each other, wherein a pore having a pore diameter of 10 µm or more and less than 50 µm in a pore distribution of the bonding layer is defined as a fine pore, and a pore having a pore diameter of 50 µm or more and 300 µm or less in a pore distribution of the bonding layer is defined as a coarse pore, a ratio of a pore volume (cc/g) of the fine pore with respect to a pore volume (cc/g) of the coarse pore is from 2.0 to 3.5, the pore volume of the fine pore is from 0.15 to 0.4 cc/g, and the pore volume of the coarse pore is from 0.05 to 0.25 cc/g.

[2] The honeycomb structure described in [1], in which the bonding layer has a porosity of 65 to 75%.

[3] The honeycomb structure described in [1] or [2], in which the crystalline anisotropic ceramic is at least one selected from a group consisting of wollastonite, mica, talc, sepiolite, an alumina fiber, a mullite fiber, a carbon fiber, a silicon carbide fiber, a boron nitride fiber, a potassium titanate fiber, and a zinc oxide fiber.

[4] The honeycomb structure described in any one of [1] to [3], in which the bonding layer has a Young's modulus of 100 MPa or less after being heated at 600° C. for 30 minutes, and has a Young's modulus of 120 MPa or less after being heated at 900° C. for 300 minutes.

[5] The honeycomb structure described in any one of [1] to [4], in which the bonding layer has a shear strength of 2000 kPa or less after being heated at 900° C. for 300 minutes.

[6] A method for manufacturing the honeycomb structure described in any one of [1] to [5], including a honeycomb segments preparation step of preparing a plurality of honeycomb segments each having a porous partition wall defining a plurality of cells that extend from a first end face as one end face to a second end face as the other end face and that serve as a channel of a fluid, by firing honeycomb formed bodies each formed of a kneaded material; a honeycomb segments with plugging portions preparation step of preparing a plurality of honeycomb segments with plugging portions which are the plurality of honeycomb segments each including plugging portions, by filling end portions of predetermined cells of each of the plurality of honeycomb segments with a plugging slurry; and a bonded body preparation step of preparing a bonded body by bonding the plurality of honeycomb segments with plugging portions to each other using a bonding slurry, wherein the bonding slurry contains a crystalline anisotropic ceramic having an aspect ratio of 7 or more, a short diameter of 5 µm or more, and a long diameter of 50 µm or more, a fine particle pore former having an average particle diameter of 60 µm or less, and a coarse particle pore former having an average particle diameter of 80 µm or more.

[7] The method for manufacturing a honeycomb structure described in [6], in which a ratio of a long diameter of the crystalline anisotropic ceramic with respect to an average particle diameter of the coarse particle pore former is from 0.7 to 1.3.

[8] The method for manufacturing a honeycomb structure described in [6] or [7], in which a content ratio of the crystalline anisotropic ceramic in a solid content of the bonding slurry is from 5 to 40% by mass.

In a honeycomb structure according to the present invention, a bonding layer contains a crystalline anisotropic ceramic and further satisfies a predetermined condition, and thereby a strength and a Young's modulus of the bonding layer are maintained without largely increasing even after a heat treatment.

In a method for manufacturing a honeycomb structure according to the present invention, a bonding layer containing a crystalline anisotropic ceramic and further satisfying a predetermined condition is formed. Therefore, in the method for manufacturing a honeycomb structure according to the present invention, it is possible to manufacture a honeycomb structure having a bonding layer of which a strength and a Young's modulus are maintained without largely increasing even after a heat treatment.

DESCRIPTION OF THE PREFERRED EMBODIMENTS

Hereinafter, an embodiment of the present invention will be described specifically with reference to the drawings. The present invention is not limited to the following embodiment. It should be understood that matters obtained by performing modification of the following embodiment, improvement thereof, or the like appropriately within a range not departing from the gist of the present invention based on usual knowledge of a person skilled in the art are also included in the scope of the present invention.

Figure 1:
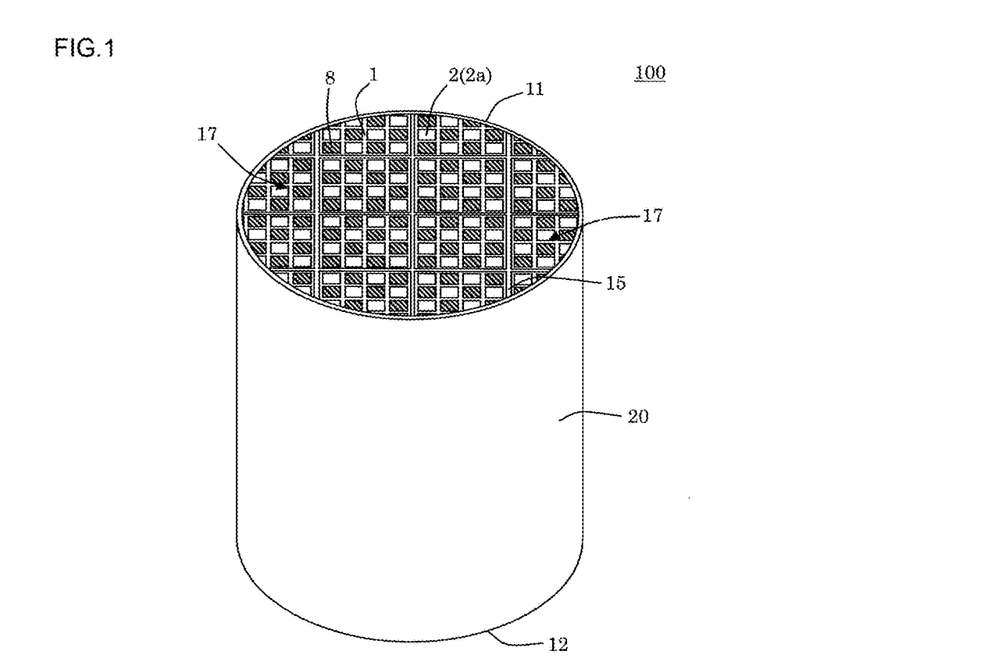
FIG. 1 is a perspective view schematically showing an embodiment of a honeycomb structure according to the present invention.

(1) Honeycomb Structure:

An embodiment of a honeycomb structure according to the present invention is a honeycomb structure 100 shown in FIG. 1. This honeycomb structure 100 includes a plurality of pillar-shaped honeycomb segments 17, and a porous bonding layer 15 containing a crystalline anisotropic ceramic and disposed so as to bond side surfaces of the plurality of honeycomb segments 17 to each other. Here, a pore having a pore diameter of 10 µm or more and less than 50 µm in a pore distribution of the bonding layer 15 is defined as a fine pore, and a pore having a pore diameter of 50 µm or more and 300 µm or less in a pore distribution of the bonding layer 15 is defined as a coarse pore. In the honeycomb structure 100, a ratio of a pore volume (cc/g) of the fine pore with respect to a pore volume (cc/g) of the coarse pore is from 2.0 to 3.5. In addition, in the honeycomb structure 100, the pore volume of the fine pore is from 0.15 to 0.4 cc/g, and the pore volume of the coarse pore is from 0.05 to 0.25 cc/g. Note that each of the plurality of honeycomb segments 17 has a porous partition wall defining a plurality of cells extending from a first end face as one end face to a second end face as the other end face and serving as a channel of a fluid. The pore distribution of the bonding layer means a Log differential pore volume distribution, and can be created by using a value measured by a mercury press-in method using a mercury porosimeter.

In the honeycomb structure 100, the bonding layer 15 contains a crystalline anisotropic ceramic and further satisfies the above condition, and thereby a strength and a Young's modulus of the bonding layer 15 are maintained without largely increasing even after a heat treatment.

Here, the bonding layer plays a role of bonding a plurality of honeycomb segments to each other, and plays a role of relaxing a stress applied to the honeycomb segments when a honeycomb structure is deformed by heat. In this way, the bonding layer plays a role of relaxing a stress, and therefore improves fracture toughness by including a fiber. However, recently, a fiber enters a human body by breathing to be accumulated, and thereby damages health, for example. Therefore, a fiber having a small fiber diameter and a large aspect ratio to easily enter a human body has limitation for its use. In addition, a fiber having a chemical composition an effect of which is worried about after the fiber enters a human body also has limitation for its use. Examples of fibers use of which is limited include a refractory ceramic fiber (RCF) which is a candidate of a substance of very high concern in European REACH regulation in addition to asbestos which has been pointed out as a carcinogen. Because of such a circumstance, recently, it has been demanded to use a fiber having less fracture toughness but having a large fiber diameter and a small aspect ratio, and being free from the fear of giving a bad influence on an inside of a human body in view of a chemical composition.

In addition, a bonding layer using a fiber having a large aspect ratio satisfies product and material characteristics at the time of manufacturing. However, when a heat treatment is performed in a step of loading a catalyst or the like, durability of a honeycomb structure may be reduced. That is, when heat is applied after manufacturing, a strength and a Young's modulus of a bonding layer are increased, and flexibility of the bonding layer may be lost. When flexibility of the bonding layer is lost, it is difficult for the bonding layer to relax a thermal stress generated under a drive environment or the like sufficiently, and it is considered that a honeycomb structure is thereby broken.

For example, conventionally, colloidal silica is used as an inorganic binder of a constituent component of a bonding layer of a honeycomb structure in some cases. This colloidal silica causes a dehydration reaction between molecules by a heat treatment, and forms a siloxane bond. Therefore, a bond between molecules of colloidal silica is strengthened. As a result, it is considered that a Young's modulus of a bonding layer is increased.

Therefore, an object of the present invention is to resolve temperature dependency of a strength and Young's modulus of a bonding layer under a condition that a fiber to which European REACH regulation is not applied (that is, a fiber having a large fiber diameter and a small aspect ratio) should be used. Specifically, the present invention achieves the above object by focusing on a heat treatment temperature dependency of a strength and a Young's modulus of a bonding layer and changing compounding of a bonding slurry being a raw material of the bonding layer.

(1-1) Bonding Layer:

A bonding layer preferably has a low Young's modulus from a viewpoint of playing a role of relaxing a thermal stress. In order to lower a Young's modulus, there is a method for increasing a porosity of the bonding layer.

However, on the other hand, in a case where a porosity is increased, it is necessary to prevent reduction of fracture toughness. Therefore, the bonding layer in the present invention contains a crystalline anisotropic ceramic, and a fine pore and a coarse pore in the bonding layer in the present invention satisfy a predetermined condition. Specifically, in this bonding layer, a Young's modulus is lowered by increasing a porosity by increasing a ratio of a fine pore with respect to the total pores. In addition, the bonding layer forms a predetermined three-dimensional net structure by forming a fine pore and a coarse pore so as to satisfy a predetermined condition, and moreover fracture toughness is maintained by disposing a crystalline anisotropic ceramic (fiber) in a skeleton portion of this three-dimensional net structure.

The "crystalline anisotropic ceramic" means a ceramic in which a primary particle has an anisotropic shape. For example, the crystalline anisotropic ceramic may have a plate shape or a needle shape.

The crystalline anisotropic ceramic is preferably at least one selected from a group consisting of wollastonite, mica, talc, sepiolite, an alumina fiber, a mullite fiber, a carbon fiber, a silicon carbide fiber, a boron nitride fiber, a potassium titanate fiber, and a zinc oxide fiber. A crystalline anisotropic ceramic formed of such a substance increases fracture toughness advantageously.

A shear strength of the bonding layer after the bonding layer is heated at 900° C. for 300 minutes is preferably 2000 kPa or less, and more preferably from 800 to 1700 kPa. When the shear strength of the bonding layer after the bonding layer is heated at 900° C. for 300 minutes is within the above range, it can be said that the strength of the bonding layer is maintained without largely increasing even after a heat treatment.

The shear strength is a value measured as follows. First, a pair structure in which two honeycomb segments are bonded to each other is cut out from a honeycomb structure. Thereafter, a shear load is applied to the pair structure in a Y-axis direction (longitudinal direction) of a bonding layer bonding the pair structure. A shear strength is calculated by the following formula (1) using a fracture load and an area of the bonding layer at this time.

$$\sigma = (W/S) \times 1000 \quad (1)$$

σ: shear strength (kPa)
W: fracture load (N)
S: area of bonding layer (mm²)

The bonding layer preferably has a Young's modulus of 100 MPa or less after being heated at 600° C. for 30 minutes, and preferably has a Young's modulus of 120 MPa or less after being heated at 900° C. for 300 minutes. In addition, the bonding layer preferably has a Young's modulus of 20 to 100 MPa after being heated at 600° C. for 30 minutes, and preferably has a Young's modulus of 20 to 120 MPa after being heated at 900° C. for 300 minutes. When the Young's modulus of the bonding layer satisfies the above condition, it can be said that the Young's modulus of the bonding layer is maintained without largely increasing (that is, a low Young's modulus is maintained) even after a heat treatment.

Note that when the Young's modulus after a heat treatment at 600° C. is performed and then a heat treatment at 900° C. is further performed is compared with the Young's modulus before the heat treatment, an increase ratio of the Young's modulus is preferably 200% or less. When the increase ratio of the Young's modulus is more than 200%, in a case where a thermal stress is generated in a honeycomb structure in a drive environment after installation on an automobile or the like, this thermal stress is not relaxed but the honeycomb structure may be broken.

The Young's modulus of the bonding layer is a value measured as follows. First, a sample having a predetermined dimension including a bonding material portion (vertical 10 mm× horizontal 10 mm to vertical 30 mm× horizontal 30 mm, thickness 0.5 to 3 mm) is cut out from a honeycomb structure. Note that the sample may have a quadrangular pillar shape or a round pillar shape, and has a diameter of 10 to 30 mm in a case of the round pillar shape. Thereafter, this sample is subjected to a compression test in a Z-axis direction. Here, the "Z-axis direction" is a direction perpendicular to a bonding surface of the bonding layer with a honeycomb segment. Note that a honeycomb segment may be partially attached to the sample (that is, a honeycomb segment may remain partially in the sample) in this test. An inclination in a stress-distortion curve when a load of 0 to 3 MPa is applied to the sample in the Z-axis direction is calculated as a Young's modulus (compression Young's modulus) by the following formula (2).

$$E = (W/S) \times (t/\Delta t) \quad (2)$$

E: compression Young's modulus (MPa)
W: load (N)
S: area of sample (mm²)
t: thickness of sample (mm)
Δt: change amount in thickness of sample A pore having a pore diameter of 10 μm or more and less than 50 μm in a pore distribution (Log differential pore volume distribution) of the bonding layer is defined as a fine pore, and a pore having a pore diameter of 50 μm or more and 300 μm or less in a pore distribution (Log differential pore volume distribution) of the bonding layer is defined as a coarse pore. Here, in the bonding layer, a ratio of a pore volume (cc/g) of the fine pore with respect to a pore volume (cc/g) of the coarse pore is from 2.0 to 3.5, preferably from 2.0 to 3.0, and more preferably from 2.0 to 2.5. When the above ratio is less than the lower limit value, a ratio of the fine pore is insufficient with respect to the coarse pore, and therefore the Young's modulus is increased by a heat treatment. When the above ratio is more than the upper limit value, the fine pore is present in an excessive ratio with respect to the coarse pore, and therefore the strength is lowered.

In the pore distribution (Log differential pore volume distribution) of the bonding layer, a pore volume of the fine pore is from 0.15 to 0.4 cc/g, preferably from 0.2 to 0.4 cc/g, and more preferably from 0.25 to 0.35 cc/g. When the above pore volume of the fine pore is less than the lower limit value, a volume of the fine pore is insufficient, and therefore the Young's modulus is increased by a heat treatment. When the above pore volume of the fine pore is more than the upper limit value, the fine pore is present in an excessive volume, and therefore the strength of the bonding layer is lowered.

In the pore distribution of the bonding layer, a pore volume of the coarse pore is from 0.05 to 0.25 cc/g, preferably from 0.1 to 0.2 cc/g, and more preferably from 0.15 to 0.2 cc/g. When the above pore volume of the coarse pore is less than the lower limit value, a volume of the coarse pore is insufficient, and therefore the Young's modulus is increased. When the above pore volume of the coarse pore is more than the upper limit value, the coarse pore is present in an excessive volume, and therefore the strength of the bonding layer is lowered.

The porosity of the bonding layer is preferably from 65 to 75%, and more preferably from 67 to 73%. When the porosity of the bonding layer is less than the lower limit value, the strength and the Young's modulus are increased, and flexibility of the bonding layer may be lost. When flexibility of the bonding layer is lost, it is difficult for the bonding layer to relax a thermal stress generated under a drive environment or the like sufficiently, and thus it is considered that a honeycomb structure is thereby broken. When the porosity of the bonding layer is more than the upper limit value, the strength of the bonding layer is lowered, and therefore it is considered that a honeycomb structure is thereby broken. The porosity of the bonding layer is a value measured with a mercury porosimeter.

(1-2) Honeycomb Segments:

Each of the plurality of honeycomb segments can contain at least one selected from a group consisting of silicon carbide, a silicon-silicon carbide composite material, silicon nitride, cordierite, mullite, alumina, spinel, a silicon carbide-cordierite composite material, a silicon-silicon carbide composite material, lithium aluminum silicate, aluminum titanate, and a Fe—Cr—Al metal as a main component. Among these materials, each of the plurality of honeycomb segments constituted by silicon carbide or a silicon-silicon carbide composite material is preferable. Note that the "silicon-silicon carbide composite material" is a composite material formed of silicon carbide as aggregates and silicon as a binding material. Here, the "main component" means a component occupying more than 50% by mass in the total components.

The average pore diameter of a partition wall 1 in each of the honeycomb segments 17 is preferably from 5 to 100 µm, and more preferably from 8 to 50 µm. When the average pore diameter is less than the lower limit value, a pressure loss is too high, and output of an engine may be reduced when the honeycomb structure according to the present invention is used for DPF. When the average pore diameter is more than the upper limit value, each honeycomb segment cannot obtain a sufficient strength in some cases. Note that the average pore diameter is a value measured with a mercury porosimeter.

The porosity of the partition wall 1 is preferably from 30 to 85%, and more preferably from 35 to 70%. When the porosity of the partition wall 1 is less than the lower limit value, a pressure loss is too high, and output of an engine may be reduced when the honeycomb structure according to the present invention is used for DPF. When the porosity of the partition wall 1 is more than the upper limit value, each honeycomb segment cannot obtain a sufficient strength in some cases. The porosity of the partition wall 1 is a value measured with a mercury porosimeter.

The thickness of the partition wall 1 is preferably from 6 to 70 mil (0.015 to 0.177 cm), and more preferably from 8 to 30 mil (0.020 to 0.076 cm). The thickness of the partition wall 1 is still more preferably from 10 to 20 mil (0.025 to 0.050 cm). When the thickness of the partition wall 1 is less than 6 mil (0.015 cm), a sufficient strength cannot be obtained in some cases. On the other hand, when the thickness of the partition wall 1 is more than 70 mil (0.177 cm), a pressure loss is too high, and output of an engine may be reduced when the honeycomb structure according to the present invention is used for DPF.

A cell shape (cell shape in a cross section perpendicular to a direction in which a cell extends) of each of the honeycomb segments 17 is not particularly limited. Examples of the cell shape of each of the honeycomb segments 17 include a triangle, a quadrangle, a hexagon, an octagon, a circle, and a combination thereof. Among quadrangles, a square or a rectangle is preferable.

A cell density of the honeycomb segments 17 is not particularly limited. The cell density of the honeycomb segments 17 is preferably from 50 to 400 cells/square inch (7.7 to 62.0 cells/cm$^2$), and more preferably from 70 to 370 cells/square inch (10.8 to 57.3 cells/cm$^2$). The cell density of the honeycomb segments 17 is still more preferably from 80 to 320 cells/square inch (12.4 to 49.6 cells/cm$^2$). When the cell density of the honeycomb segments 17 is less than 50 cells/square inch (7.7 cells/cm$^2$), the honeycomb segments cannot obtain a sufficient strength in some cases. On the other hand, when the cell density of the honeycomb segments 17 is more than 400 cells/square inch (62.0 cells/cm$^2$), a pressure loss is too high, and output of an engine may be reduced when the honeycomb structure according to the present invention is used for DPF.

Figure 2:
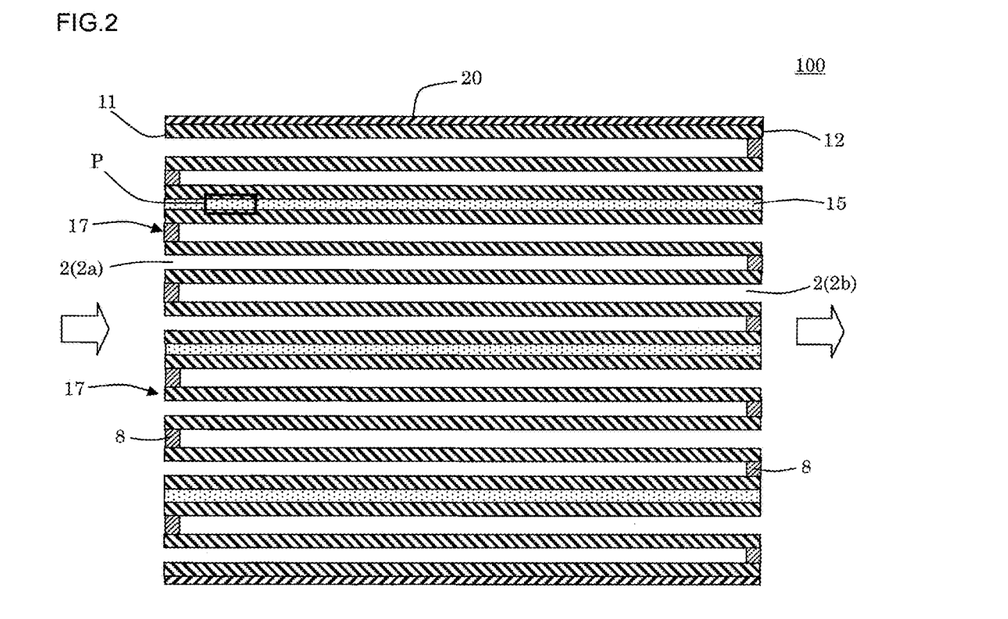
FIG. 2 is a cross-sectional view schematically showing a cross section of an embodiment of a honeycomb structure according to the present invention in a direction in which a cell extends.
Figure 3:
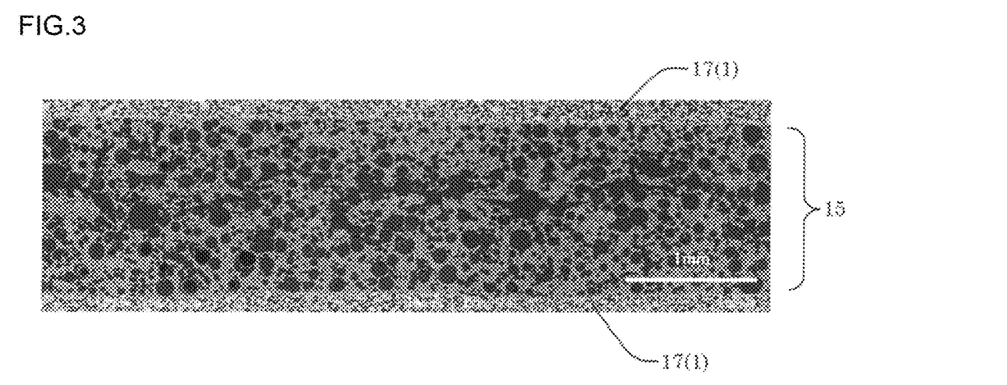
FIG. 3 is an enlarged photograph of an SEM (scanning electron microscope) image of a portion corresponding to a region P in FIG. 2 in a honeycomb structure in Example 1.
Figure 4:
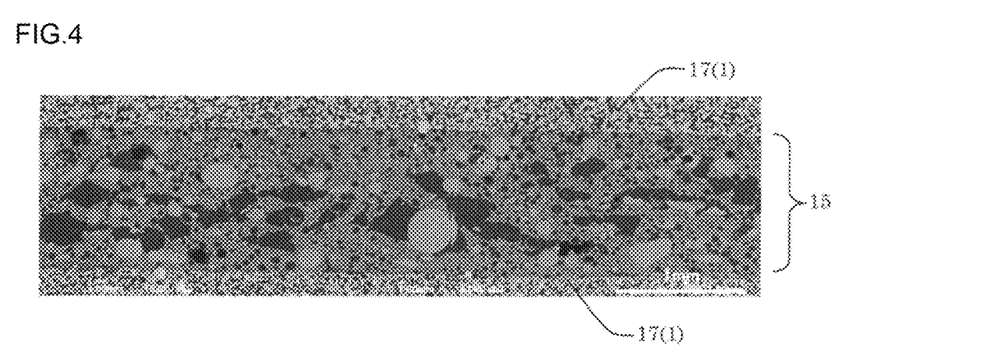
FIG. 4 is an enlarged photograph of an SEM (scanning electron microscope) image of a portion corresponding to a region P in FIG. 2 in a honeycomb structure in Comparative Example 1.
Figure 5:
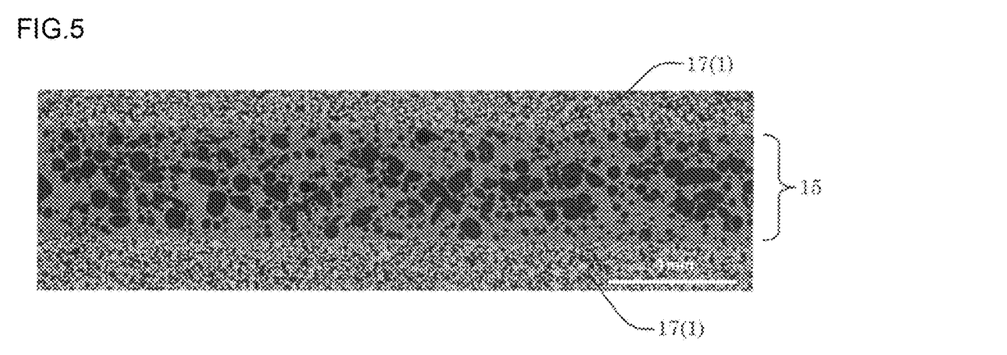
FIG. 5 is an enlarged photograph of an SEM (scanning electron microscope) image of a portion corresponding to a region P in FIG. 2 in a honeycomb structure in Comparative Example 2.

Each of the honeycomb segments 17 may include plugging portions disposed in open ends of at least a part of the cells. When each of the honeycomb segments 17 includes plugging portions, an exhaust gas which has flowed in the honeycomb structure according to the present invention is filtered by a partition wall, and therefore a particulate matter in the exhaust gas can be trapped favorably. The honeycomb structure 100 shown in FIGS. 1 and 2 includes plugging portions 8 disposed in open ends of predetermined cells 2 (inflow cells 2a) on one end face and open ends of residual cells 2 (outflow cells 2b) on the other end face. The inflow cells 2a and the outflow cells 2b are arranged alternately. A checkered pattern is thereby formed by the plugging portions 8 and the "open ends of the cells" on each of a first end face 11 and a second end face 12 in the honeycomb structure 100.

A material of the plugging portions 8 may be the same as or different from a material of the honeycomb segments 17. The material of the plugging portions 8 is preferably a preferable material as the honeycomb segments 17.

The shape of the honeycomb structure 100 is not particularly limited. Preferable examples of the shape of the honeycomb structure 100 include a round pillar shape, a pillar shape having an elliptical end face, and a pillar shape having a polygonal (square, rectangle, triangle, pentagon, hexagon, octagon, or the like) end face. The honeycomb structure 100 shown in FIG. 1 has a round pillar shape.

As shown in FIG. 1, the honeycomb structure 100 may have an outer periphery coat layer 20 in an outer periphery thereof. The material of the outer periphery coat layer 20 may be the same as or different from that of the bonding layer. By forming the outer periphery coat layer 20, a defect such as breakage is hardly generated even when an external force is applied to the honeycomb structure 100 during transportation thereof or the like.

(2) Method for Manufacturing Honeycomb Structure According to the Present Invention:

A honeycomb structure according to the present invention can be manufactured by the following method. That is, the honeycomb structure according to the present invention can be manufactured by a method including a honeycomb segments preparation step, a honeycomb segments with plugging portions preparation step, a bonded body preparation step, and an outer periphery coat layer forming step. The honeycomb segments preparation step is a step of preparing honeycomb segments (honeycomb fired bodies) by firing honeycomb formed bodies. The honeycomb segments with plugging portions preparation step is a step of preparing honeycomb segments each including plugging portions (honeycomb segments with plugging portions) by filling predetermined cells of each of the honeycomb segments prepared in the honeycomb segments preparation step with a plugging slurry. The bonded body preparation step is a step of preparing a bonded body including a plurality of honeycomb segments and a bonding layer bonding these honeycomb segments to each other by bonding honeycomb segments with plugging portions to each other using a bonding material (bonding slurry). The outer periphery coat layer forming step is a step of forming an outer periphery coat layer by cutting an outer periphery of the prepared bonded body, then applying an outer periphery coat material to an outer periphery of the cut bonded body, and drying the outer periphery coat material. Note that the "honeycomb segments" are a plurality of pillar-shaped segments having a porous partition wall defining a plurality of cells extending from a first end face as one end face to a second end face as the other end face and serving as a channel of a fluid.

Hereinafter, a method for manufacturing a honeycomb structure according to the present invention will be described for each step.

(2-1) Honeycomb Segments Preparation Step:

Each of honeycomb segments can be prepared by a conventionally-known method. More specifically, a binder, a pore former, a surfactant, and water as a liquid medium are added to a material of each of honeycomb segments containing silicon carbide and a bonding material, and the resulting mixture is kneaded to prepare a plastic kneaded material. The prepared kneaded material is formed into pillar-shaped bodies, and is dried. Thereafter, the formed bodies are fired and oxidized. In this way, honeycomb segments can be prepared. Examples of the binder include methyl cellulose, hydroxypropoxyl cellulose, hydroxyethyl cellulose, carboxymethyl cellulose, and polyvinyl alcohol.

A kneading method, a method for forming a prepared kneaded material into each of pillar-shaped bodies, or a drying method is not particularly limited. Examples of the kneading method include a method using a kneader, a vacuum pugmill, or the like. In addition, examples of the method for forming a prepared kneaded material into each of pillar-shaped bodies include a conventionally-known method such as extrusion, injection molding, or press molding. Among these methods, an extrusion method using a honeycomb segment forming die for causing a prepared kneaded material to have a desired outer wall thickness, partition wall thickness, and cell density is preferable. Furthermore, examples of the drying method include a conventionally-known drying method such as hot air drying, microwave drying, dielectric drying, reduced pressure drying, vacuum drying, or freeze drying. Among these methods, a drying method combining hot air drying with microwave drying or dielectric drying is preferably used in terms of being able to dry the whole rapidly and uniformly.

Examples of the firing method include a method in which firing is carried out in a firing furnace. A firing furnace and a firing condition can be selected appropriately according to the shape of each honeycomb segment, a material thereof, or the like. An organic substance such as binder may be burned to be removed by calcining before firing.

An oxidation treatment can be performed by a conventionally-known method. As the oxidation treatment, specifically, a method in which fired honeycomb segments containing silicon carbide are heated in an oxygen atmosphere (for example, oxygen concentration 5 to 20% by mass) to a temperature in the range of 1000 to 1400° C. to oxidize a part of silicon carbide constituting the honeycomb segments can be employed.

(2-2) Honeycomb Segments with Plugging Portions Preparation Step:

In this step, predetermined cells of each of the honeycomb segments prepared in the honeycomb segments preparation step are filled with a plugging slurry to prepare honeycomb segments each including plugging portions (honeycomb segments with plugging portions).

As a method for forming plugging portions in the cells, a conventionally-known method can be used. More specifically, a sheet is stuck to an end face of each of the honeycomb segments, and then holes are opened at positions corresponding to the cells to form plugging portions, in this sheet. While this sheet is stuck, the end face is immersed in a plugging slurry, open ends of the cells to form plugging portions are filled with the plugging slurry through the holes opened in the sheet, and the plugging slurry is dried and fired. Such a method can be employed.

(2-3) Bonded Body Preparation Step:

In this step, honeycomb segments with plugging portions are bonded to each other using a bonding slurry to prepare a bonded body. As the bonding slurry, a slurry essentially containing a crystalline anisotropic ceramic, a fine particle pore former having an average particle diameter of 30 μm or less, and a coarse particle pore former having an average particle diameter of 100 μm or more is used. The bonded body includes a plurality of honeycomb segments and a bonding layer bonding these honeycomb segments to each other.

Here, in the present invention, by increasing a ratio of a fine pore, a porosity of a bonding layer is increased, and as a result, a Young's modulus is lowered. In order to increase a ratio of a fine pore, during manufacturing of a bonding layer, a fine particle pore former to form a fine pore and a coarse particle pore former to form a coarse pore are dispersed while being close to closest packing. In order to disperse a fine particle pore former and a coarse particle pore former in such a state close to closest packing, it is preferable to combine and use a fine particle pore former having an average particle diameter of 30 μm or less and a coarse particle pore former having an average particle diameter of 80 μm or more. Because of this, this step includes the above fine particle pore former and coarse particle pore former essentially.

A crystalline anisotropic ceramic has an aspect ratio of 7 or more, a short diameter (fiber diameter) of 5 μm or more, and a long diameter of 50 μm or more.

A content ratio of the crystalline anisotropic ceramic in a solid content of a bonding slurry is preferably from 5 to 40% by mass, and more preferably from 9 to 20% by mass. By the content ratio of the crystalline anisotropic ceramic within the above range, the anisotropic ceramic suppresses progress of a crack, and therefore fracture toughness is improved. When the content ratio of the crystalline anisotropic ceramic is less than the lower limit value, fracture toughness is reduced, and therefore durability may be reduced. When the content ratio of the crystalline anisotropic ceramic is more than the upper limit value, the anisotropic ceramic is present excessively, which makes it difficult to mix as a slurry in which the anisotropic ceramic is dispersed uniformly. As a result, productivity may be lowered.

As described above, the crystalline anisotropic ceramic has an aspect ratio of 7 or more, preferably of 15 or more, and more preferably of 18 to 40.

The crystalline anisotropic ceramic has a short diameter of 5 μm or more, preferably of 5 to 10 μm, and more preferably of 5 to 7 μm. In addition, the crystalline anisotropic ceramic has a long diameter of 50 μm or more, preferably of 100 μm or more, and more preferably of 120 to 200 μm.

In the manufacturing method according to the present invention, a crystalline anisotropic ceramic used satisfies the above conditions of an aspect ratio, a short diameter, and a long diameter, which leads to realization of an effect of the present invention. When a crystalline anisotropic ceramic used does not satisfy the above conditions of an aspect ratio, a short diameter, and a long diameter, fracture toughness is reduced, and therefore durability is reduced.

The crystalline anisotropic ceramic is preferably at least one selected from a group consisting of wollastonite, mica, talc, sepiolite, an alumina fiber, a mullite fiber, a carbon fiber, a silicon carbide fiber, a boron nitride fiber, a potassium titanate fiber, and a zinc oxide fiber. A crystalline anisotropic ceramic formed of such a substance increases fracture toughness advantageously. Note that the mullite fiber does not correspond to RCF to which European REACH regulation is applied.

As described above, an average particle diameter of the fine particle pore former is 60 μm or less, preferably from 20 to 60 μm, and more preferably from 35 to 50 μm. By the average particle diameter of the fine particle pore former within the above range, a fine pore having a pore diameter of 10 μm or more and less than 50 μm can be formed.

As the fine particle pore former, for example, a fine particle pore former formed of an inorganic substance or an organic substance may be used. Preferable examples of the pore former formed of an inorganic substance include a hollow inorganic balloon such as a fly ash balloon or a Shirasu balloon. Preferable examples of the pore former formed of an organic substance include a hollow or solid organic balloon such as a foamable resin, a water absorbable resin, and starch.

A content ratio of the fine particle pore former can be from 0.1 to 10% by mass relative to a solid content of a bonding slurry. By the above content ratio of the fine particle pore former, a fine pore having a pore diameter of 10 μm or more and less than 50 μm can be formed at a predetermined pore volume (cc/g).

As described above, an average particle diameter of the coarse particle pore former is 80 μm or more, preferably from 100 to 200 μm, and more preferably from 125 to 155 μm. By the average particle diameter of the coarse particle pore former within the above range, a coarse pore having a pore diameter of 50 μm or more and 300 μm or less can be formed.

As the coarse particle pore former, for example, a coarse particle pore former formed of an inorganic substance or an organic substance may be used. Preferable examples of the pore former formed of an inorganic substance include a hollow inorganic balloon such as a fly ash balloon or a Shirasu balloon. Preferable examples of the pore former formed of an organic substance include a hollow or solid organic balloon such as a foamable resin, a water absorbable resin, and starch.

A content ratio of the coarse particle pore former can be from 0.1 to 10% by mass relative to a solid content of a bonding slurry. By the above content ratio of the coarse particle pore former, a coarse pore having a pore diameter of 50 μm or more and 300 μm or less can be formed at a predetermined pore volume (cc/g).

A ratio of a long diameter of the crystalline anisotropic ceramic with respect to an average particle diameter of the coarse particle pore former is preferably from 0.6 to 1.6, and more preferably from 0.7 to 1.3. By the above ratio within the above range, the anisotropic ceramic is three-dimensionally disposed in a three-dimensional net structure formed by a pore former. Therefore, the obtained bonding layer has a high strength and a low Young's modulus, and fracture toughness of the obtained bonding layer is improved. When the above ratio is less than the lower limit value, the length of the anisotropic ceramic is reduced relatively with respect to a particle diameter of a pore former, and therefore fracture toughness may be reduced. When the above ratio is more than the upper limit value, the number of pores formed by a pore former is reduced relatively, and therefore a Young's modulus may be increased.

(2-4) Outer Periphery Coat Layer Forming Step:

In this step, an outer periphery of a bonded body is cut to obtain a desired outer periphery shape. A cutting method is not particularly limited, but a conventionally-known method can be used.

As described above, an outer periphery coat material is applied to an outer periphery of the bonded body obtained by cutting an outer periphery to form an outer periphery coat layer. In this way, a honeycomb structure can be obtained. By forming the outer periphery coat layer, breakage of a honeycomb structure can be prevented when an external force is applied to the honeycomb structure.

Examples of the outer periphery coat material include a material obtained by adding water to a mixture obtained by adding an additive such as an organic binder, a foamable resin, or a dispersing agent to an inorganic raw material such as an inorganic fiber, colloidal silica, clay, or SiC particles, and kneading the resulting mixture. Examples of a method for applying the outer periphery coat material include a method for performing coating with a rubber spatula while the "cut bonded body" is rotated on a lathe.

EXAMPLES

Hereinafter, the present invention will be described more specifically based on Examples. The present invention is not limited by the Examples in any way.

Example 1

(Preparation of Honeycomb Segments)

First, as a raw material of honeycomb segments, powdery silicon carbide and powdery metal silicon were mixed at a mass ratio of 80:20. A pore former, a binder, a surfactant, and water were added thereto to prepare a plastic kneaded material.

The prepared kneaded material was subjected to extrusion, and was dried with microwave and hot air to obtain honeycomb segment formed bodies each having a partition wall thickness of 310 μm, a cell density of 46.5 cells/cm$^2$ (300 cells/square inch), a square cross section with one side of 35 mm, and a length of 152 mm.

One end portion of each cell was plugged such that end faces of each of these honeycomb segment formed bodies exhibited a checkered pattern. That is, plugging was performed such that adjacent cells were sealed with end portions which are opposite to each other. Note that as a filler for plugging an end portion of a cell, a material similar to the raw material of the honeycomb segments was used.

Subsequently, this filler was dried, and then the honeycomb segment formed bodies were degreased in an air atmosphere at 400° C.

Subsequently, the degreased honeycomb segment formed bodies were further fired in an Ar inert atmosphere at 1450°

C. to obtain porous honeycomb segments each constituted by a silicon-silicon carbide composite material.

(Preparation of Bonding Material)

Subsequently, a powdery raw material of a bonding material was prepared. Specifically, in the powdery raw material, 15% by mass of a crystalline anisotropic ceramic (aspect ratio 25) and 50% by mass of powdery silicon carbide were mixed, and 3.0% by mass of powdery alumina was further added to prepare a powdery raw material of a bonding material. As the crystalline anisotropic ceramic, a mullite fiber was used. An inorganic binder having a solid content of 40% was added for the residual % by mass. Table 1 shows a composition ratio. Note that "%" in Table 1 indicates % by mass.

Subsequently, 3.0% by mass of a fine particle pore former (average particle diameter 40 μm), 3.0% by mass of a coarse particle pore former (average particle diameter 140 μm), 0.6 parts by mass of an organic binder, 20 parts by mass of water, and 0.25 parts by mass of a dispersing agent were added to 100 parts by mass of the resulting powdery raw material, and were mixed to obtain a mixture. Note that carboxymethyl cellulose was used for the organic binder. Polyethyleneglycol oleate was used for the dispersing agent.

Subsequently, the resulting mixture was kneaded with a mixer for 30 minutes to obtain a paste-like bonding material composition (bonding slurry). Furthermore, by adding water thereto, this paste-like bonding material composition was adjusted so as to have a viscosity of 300 dPa·s.

(Preparation of Honeycomb Structure)

A bonding material composition was applied to an outer wall surface of one honeycomb segment of the honeycomb segments so as to have a thickness of 1 mm, and another honeycomb segment of the honeycomb segments was placed thereon. This step was repeated to prepare a honeycomb segment laminated body formed of the total 16 honeycomb segments assembled in 4×4.

Thereafter, while honeycomb segments forming the honeycomb segment laminated body were pressure-bonded to each other by applying a pressure thereto from an outside, the honeycomb segment laminated body was dried at 140° C. for 2 hours to obtain a bonded body.

Subsequently, an outer periphery of the obtained bonded body was cut such that an entire cross-sectional shape when the obtained bonded body was cut with a plane perpendicular to a central axis thereof was circular. Thereafter, an outer periphery coat material having the same composition as the bonding material was applied to the processed surface. The outer periphery coat material was dried and cured at 700° C. for 2 hours to obtain a honeycomb structure.

For the resulting honeycomb structure, the following "shear strength of bonding layer" and "Young's modulus of bonding layer" were measured.

(1) Measurement of Shear Strength of Bonding Layer:

The shear strength of a bonding layer was measured by the following method before and after a heat treatment of a honeycomb structure. The heat treatment of a honeycomb structure was performed under the conditions of (i) 500° C. and 0.5 hours, (ii) 600° C. and 0.5 hours, and (iii) 900° C. and 5 hours.

First, a pair structure in which two honeycomb segments were bonded to each other was cut out from a honeycomb structure. Thereafter, a shear load was applied to the pair structure in a Y-axis direction (longitudinal direction) of a bonding layer bonding the pair structure. A shear strength was calculated by the following formula (1) using a fracture load and an area of the bonding layer at this time. Table 2 shows results thereof.

$$\sigma = (W/S) \times 1000 \quad (1)$$

σ: shear strength (kPa)
W: fracture load (N)
S: area of bonding layer (mm²)

(2) Measurement of Young's Modulus of Bonding Layer:

A Young's modulus of a bonding layer was measured by the following method before and after a heat treatment of a honeycomb structure. The heat treatment of a honeycomb structure was performed under a similar condition to "(1) Measurement of shear strength of bonding layer".

First, a round pillar-shaped sample having a predetermined dimension including a bonding material portion (diameter 25.4 mm, thickness 3 mm) was cut out from a honeycomb structure. Thereafter, this sample was subjected to a compression test in a Z-axis direction. Here, the "Z-axis direction" is a direction perpendicular to a bonding surface of the bonding layer with a honeycomb segment. Note that a honeycomb segment may be partially attached to the sample in this test. An inclination in a stress-distortion curve when a load of 0 to 3 MPa was applied to the sample in the Z-axis direction was calculated as a Young's modulus (compression Young's modulus) by the following formula (2). Table 2 shows results thereof.

$$E = (W/S) \times (t/\Delta t) \quad (2)$$

E: compression Young's modulus (MPa)
W: load (N)
S: area of sample (mm²)
t: thickness of sample (mm)
Δt: change amount in thickness of sample

TABLE 1

|  | Example 1 | Example 2 | Comparative Example 1 | Comparative Example 2 | Comparative Example 3 |
|---|---|---|---|---|---|
| silicon carbide | 50.0% | 50.0% | 50.0% | 50.0% | 50.0% |
| alumina | 3.0% | 3.0% | 3.0% | 9.0% | 9.0% |
| mullite fiber | 15.0% | 15.0% | 15.0% | 9.0% | 9.0% |
| water (for adjusting viscosity) | 19.0% | 19.0% | 23.0% | 17.0% | 17.0% |
| fine particle pore former | 3.0% | 5.0% | 7.0% | 1.5% | — |
| coarse particle pore former | 3.0% | 2.5% | 2.5% | 2.0% | 5.0% |

TABLE 2

|  | porosity of bonding layer (%) | pore volume of fine pore (cc/g) | pore volume of coarse pore (cc/g) | ratio of fine pore/ coarse pore | shear strength (kPa) | | | | Young's modulus (MPa) | | | |
|---|---|---|---|---|---|---|---|---|---|---|---|---|
|  |  |  |  |  | before heat treatment | 500° C. | 600° C. | 900° C. | before heat treatment | 500° C. | 600° C. | 900° C. |
| Example 1 | 70 | 0.33 | 0.16 | 2.1 | 800 | 900 | 900 | 1000 | 60 | 60 | 60 | 70 |
| Example 2 | 70 | 0.38 | 0.12 | 3.2 | 700 | 800 | 800 | 900 | 60 | 60 | 60 | 65 |

TABLE 2-continued

|  | porosity of bonding layer (%) | pore volume of fine pore (cc/g) | pore volume of coarse pore (cc/g) | ratio of fine pore/ coarse pore | shear strength (kPa) | | | | Young's modulus (MPa) | | | |
| --- | --- | --- | --- | --- | --- | --- | --- | --- | --- | --- | --- | --- |
|  |  |  |  |  | before heat treatment | 500° C. | 600° C. | 900° C. | before heat treatment | 500° C. | 600° C. | 900° C. |
| Comparative Example 1 | 72 | 0.45 | 0.12 | 4.2 | 400 | 450 | 450 | 500 | 30 | 30 | 30 | 40 |
| Comparative Example 2 | 63 | 0.13 | 0.08 | 1.7 | 900 | 1000 | 1000 | 1100 | 80 | 90 | 110 | 250 |
| Comparative Example 3 | 68 | 0.05 | 0.25 | 0.2 | 500 | 600 | 600 | 700 | 60 | 70 | 70 | 150 |

Example 2 and Comparative Examples 1 to 3

A honeycomb structure was prepared in a similar manner to Example 1 except that the conditions were changed as shown in Table 1. For the prepared honeycomb structure, the "shear strength of bonding layer" and "Young's modulus of bonding layer" were measured in a similar manner to Example 1. Table 2 shows results thereof Table 2 indicates that honeycomb structures in Examples 1 and 2 have a high strength of a bonding layer of 800 kPa after a heat treatment and maintain a low Young's modulus of 120 MPa or less even after the heat treatment as compared with honeycomb structures in Comparative Examples 1 to 3. Note that as for the bonding layer in Comparative Example 1, a low Young's modulus of 120 MPa or less is maintained but a shear strength is low, and therefore the strength is not sufficient. The bonding layer preferably has a shear strength of 800 kPa or more.

The honeycomb structure according to the present invention can be used as a filter for purifying an exhaust gas of an automobile or the like. The method for manufacturing a honeycomb structure according to the present invention can be employed as a method for manufacturing a honeycomb structure which can be used as a filter for purifying an exhaust gas of an automobile or the like.

DESCRIPTION OF REFERENCE NUMERALS

1: partition wall, 2: cell, 2a: inflow cell, 2b: outflow cell, 8: plugging portion, 11: first end face, 12: second end face, 15: bonding layer, 17: honeycomb segment, 20: outer periphery coat layer, 100: honeycomb structure, P: region

What is claimed is:

1. A honeycomb structure comprising:
    a plurality of pillar-shaped honeycomb segments each having a porous partition wall defining a plurality of cells that extend from a first end face as one end face to a second end face as the other end face and that serve as a channel of a fluid; and
    a porous bonding layer containing a crystalline anisotropic ceramic and disposed so as to bond side surfaces of the plurality of honeycomb segments to each other, wherein
    a pore having a pore diameter of 10 μm or more and less than 50 μm in a pore distribution of the bonding layer is defined as a fine pore, and a pore having a pore diameter of 50 μm or more and 300 μm or less in a pore distribution of the bonding layer is defined as a coarse pore,
    a ratio of a pore volume (cc/g) of the fine pore with respect to a pore volume (cc/g) of the coarse pore is from 2.0 to 3.5,
    the pore volume of the fine pore is from 0.15 to 0.4 cc/g, and
    the pore volume of the coarse pore is from 0.05 to 0.25 cc/g.

2. The honeycomb structure according to claim 1, wherein the bonding layer has a porosity of 65 to 75%.

3. The honeycomb structure according to claim 2, wherein the crystalline anisotropic ceramic is at least one selected from a group consisting of wollastonite, mica, talc, sepiolite, an alumina fiber, a mullite fiber, a carbon fiber, a silicon carbide fiber, a boron nitride fiber, a potassium titanate fiber, and a zinc oxide fiber.

4. The honeycomb structure according to claim 3, wherein the bonding layer has a Young's modulus of 100 MPa or less after being heated at 600° C. for 30 minutes, and has a Young's modulus of 120 MPa or less after being heated at 900° C. for 300 minutes.

5. The honeycomb structure according to claim 4, wherein the bonding layer has a shear strength of 2000 kPa or less after being heated at 900° C. for 300 minutes.

6. A method for manufacturing the honeycomb structure according to claim 5, comprising:
    a honeycomb segments preparation step of preparing a plurality of honeycomb segments each having a porous partition wall defining a plurality of cells that extend from a first end face as one end face to a second end face as the other end face and that serve as a channel of a fluid, by firing honeycomb formed bodies each formed of a kneaded material;
    a honeycomb segments with plugging portions preparation step of preparing a plurality of honeycomb segments with plugging portions which are the plurality of honeycomb segments each including plugging portions, by filling end portions of predetermined cells of each of the plurality of honeycomb segments with a plugging slurry; and
    a bonded body preparation step of preparing a bonded body by bonding the plurality of honeycomb segments with plugging portions to each other using a bonding slurry, wherein the bonding slurry contains
    a crystalline anisotropic ceramic having an aspect ratio of 7 or more, a short diameter of 5 μm or more, and a long diameter of 50 μm or more,
    a fine particle pore former having an average particle diameter of 60 μm or less, and
    a coarse particle pore former having an average particle diameter of 80 μm or more.

7. The method for manufacturing a honeycomb structure according to claim 6, wherein a ratio of a long diameter of the crystalline anisotropic ceramic with respect to an average particle diameter of the coarse particle pore former is from 0.7 to 1.3.

8. The method for manufacturing a honeycomb structure according to claim 7, wherein a content ratio of the crystalline anisotropic ceramic in a solid content of the bonding slurry is from 5 to 40% by mass.

9. The honeycomb structure according to claim 1, wherein the crystalline anisotropic ceramic is at least one selected from a group consisting of wollastonite, mica, talc, sepiolite, an alumina fiber, a mullite fiber, a carbon fiber, a silicon carbide fiber, a boron nitride fiber, a potassium titanate fiber, and a zinc oxide fiber.

10. The honeycomb structure according to claim 1, wherein the bonding layer has a Young's modulus of 100 MPa or less after being heated at 600° C. for 30 minutes, and has a Young's modulus of 120 MPa or less after being heated at 900° C. for 300 minutes.

11. The honeycomb structure according to claim 1, wherein the bonding layer has a shear strength of 2000 kPa or less after being heated at 900° C. for 300 minutes.

12. A method for manufacturing the honeycomb structure according to claim 1, comprising:
a honeycomb segments preparation step of preparing a plurality of honeycomb segments each having a porous partition wall defining a plurality of cells that extend from a first end face as one end face to a second end face as the other end face and that serve as a channel of a fluid, by firing honeycomb formed bodies each formed of a kneaded material;
a honeycomb segments with plugging portions preparation step of preparing a plurality of honeycomb segments with plugging portions which are the plurality of honeycomb segments each including plugging portions, by filling end portions of predetermined cells of each of the plurality of honeycomb segments with a plugging slurry; and
a bonded body preparation step of preparing a bonded body by bonding the plurality of honeycomb segments with plugging portions to each other using a bonding slurry, wherein the bonding slurry contains
a crystalline anisotropic ceramic having an aspect ratio of 7 or more, a short diameter of 5 μm or more, and a long diameter of 50 μm or more,
a fine particle pore former having an average particle diameter of 60 μm or less, and
a coarse particle pore former having an average particle diameter of 80 μm or more.

13. The method for manufacturing a honeycomb structure according to claim 12, wherein a ratio of a long diameter of the crystalline anisotropic ceramic with respect to an average particle diameter of the coarse particle pore former is from 0.7 to 1.3.

14. The method for manufacturing a honeycomb structure according to claim 12, wherein a content ratio of the crystalline anisotropic ceramic in a solid content of the bonding slurry is from 5 to 40% by mass.

* * * * *